Aug. 14, 1962    V. ASARO ETAL    3,049,377
SEAT CONSTRUCTION
Filed Aug. 24, 1959    3 Sheets-Sheet 1
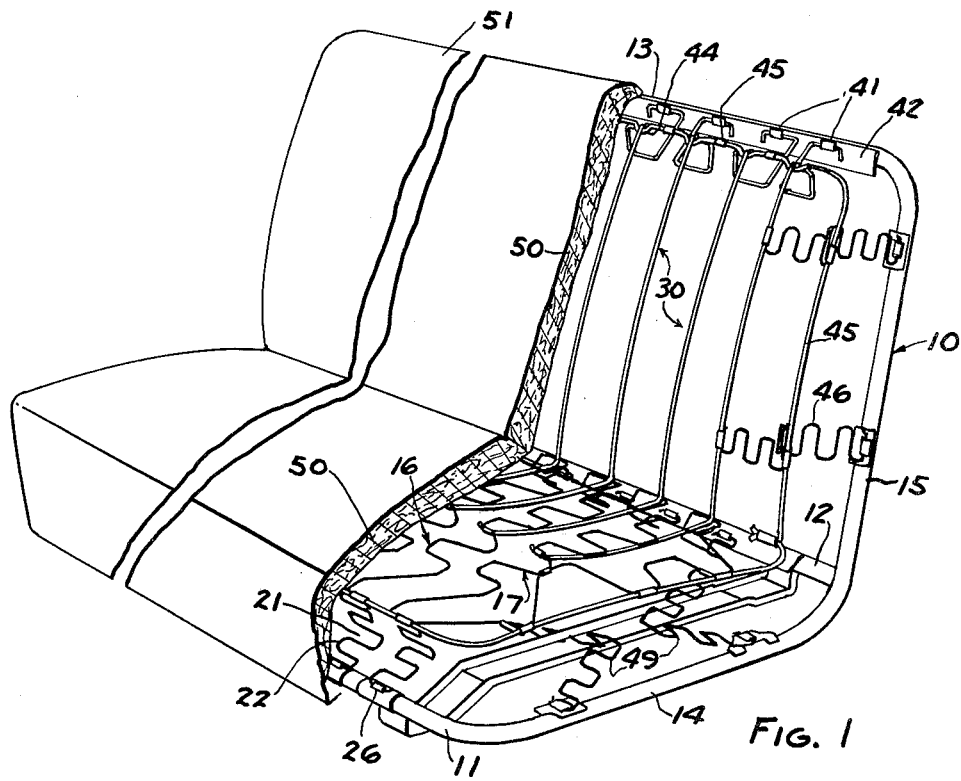
FIG. 1
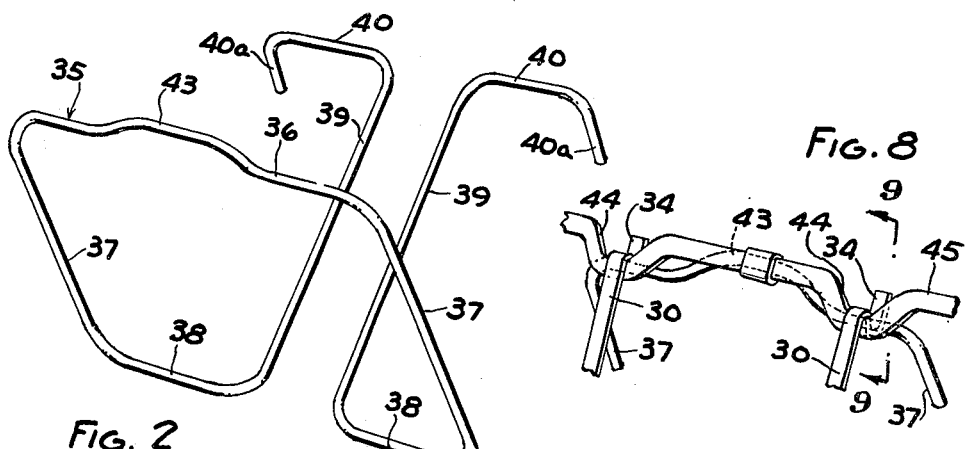
FIG. 2
FIG. 8
INVENTORS
VITO ASARO & ANTHONY CIESIELSKI
BY
Barnes, Kisselle, Raisch & Choate
ATTORNEYS Aug. 14, 1962
V. ASARO ETAL
3,049,377
SEAT CONSTRUCTION
Filed Aug. 24, 1959
3 Sheets-Sheet 2
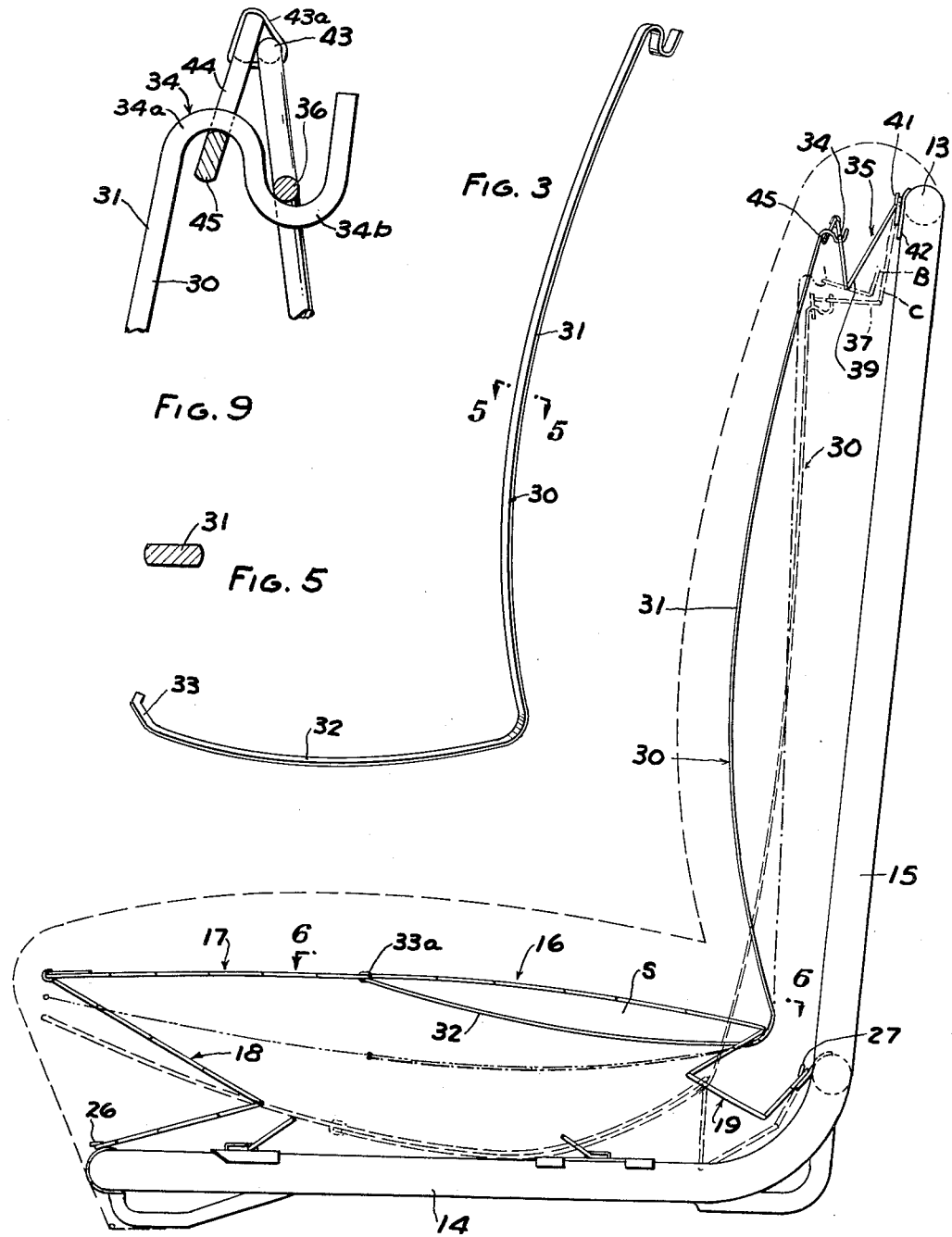
INVENTORS
VITO ASARO & ANTHONY CIESIELSKI
BY
Barnes, Kisselle, Raisch & Choate
ATTORNEYS

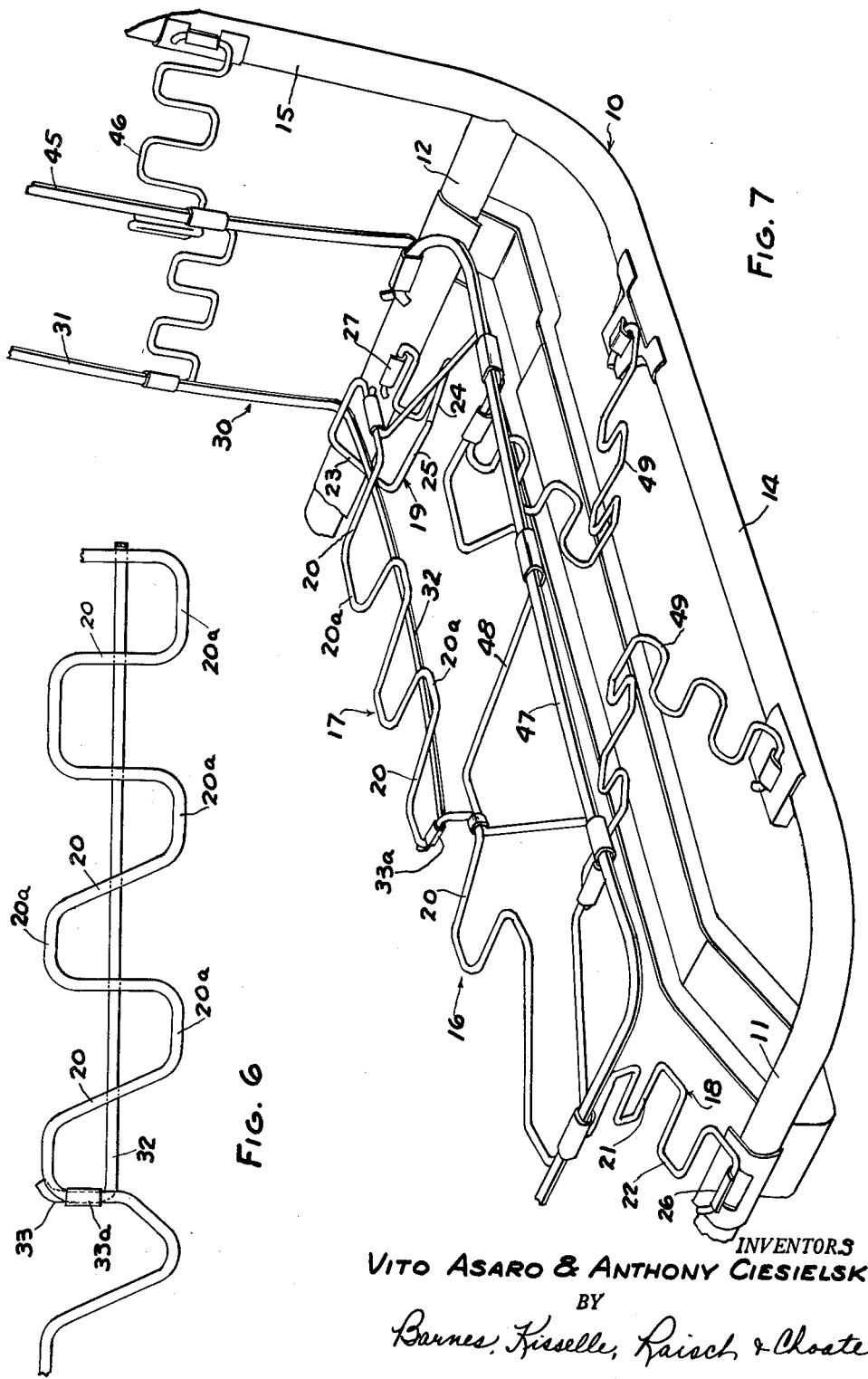

United States Patent Office 3,049,377
Patented Aug. 14, 1962

3,049,377
SEAT CONSTRUCTION
Vito Asaro, East Detroit, and Anthony Ciesielski, Detroit, Mich., assignors to Young Spring & Wire Corporation, Detroit, Mich., a corporation of Michigan
Filed Aug. 24, 1959, Ser. No. 835,492
10 Claims. (Cl. 297—456)

This invention relates to a vehicle seat construction and more particularly to a seat having bottom and back cushions employing wire spring elements.

Bottom and back seat cushions sometimes incorporate a plurality of horizontally extending, transversely spaced sinuous spring elements connected at their ends to the bottom portion of the seat frame and a plurality of vertically extending, transversely spaced sinuous spring elements connected at their ends to the back portion of the seat frame. Such a construction in addition to being relatively expensive, has an obvious disadvantage in that the bottom cushion and the back cushion flex independently so that as the passenger rides along in the vehicle, his clothing tends to be pulled upwardly by the independent action of the back cushion relative to the bottom cushion.

It is an object of this invention to provide a seat bottom and back cushion construction which is relatively less expensive; which provides the desired yielding support of the passenger; and which at the same time substantially lessens any tendency of the clothing of the passenger to be pulled upwardly by any independent action of the back cushion relative to the seat cushion.

In the drawings:

FIG. 1 is a part sectional perspective view of a seat embodying the subject invention.

FIG. 2 is a perspective view of a spring element used in the seat shown in FIG. 1.

FIG. 3 is a perspective view of another spring element used in the seat in FIG. 1.

FIG. 4 is a side elevation of the seat shown in FIG. 1, parts being broken away and the exterior trim surface being shown in phantom.

FIG. 5 is a cross sectional view taken along the line 5—5 in FIG. 3.

FIG. 6 is a sectional view taken along the line 6—6 in FIG. 4.

FIG. 7 is an enlarged fragmentary perspective view of a portion of the seat shown in FIG. 1.

FIG. 8 is an enlarged fragmentary perspective view of another portion of the seat shown in FIG. 1.

FIG. 9 is a fragmentary sectional view taken along the line 9—9 in FIG. 8.

Referring to FIG. 1, the seat comprises a unitary tubular seat frame 10 having a front rail 11, rear rail 12 and upper rail 13 connected by horizontal side rails 14 and vertical side rails 15, respectively.

The bottom cushion is formed by a plurality of transversely spaced, identically shaped sinuous spring elements 16, each of which has a central horizontally disposed load bearing portion 17 and V-shaped front and rear supporting portions 18, 19 at opposite ends thereof (FIG. 4).

Load supporting portion 17 comprises a plurality of zig-zag loops formed by transverse straight bars 20 connected by longitudinally extending straight bars 20a. The shape of these loops is further shown and described in the copending application of Vito Asaro and Henry J. Tischler, titled Seat Construction, Serial No. 757,534, filed August 27, 1958, and assigned to the assignee of this application.

Front supporting portion 18 of each spring element 16 comprises a plurality of loops formed by transverse straight bars 21 connected by longitudinally extending straight bars 22. Rear supporting portion 19 of each spring element 16 is formed by longitudinally extending straight bars 23, 24 connected by a straight horizontal bar 25. The free ends of the supporting portions 18, 19 are fastened to front and rear rails 11, 12 respectively, by engagement with tabs 26, 27 (FIG. 7).

The above described construction of each spring element 16 is preferred but as will be readily understood other types of spring elements may be used in the invention.

The back cushion is formed by a plurality of transversely spaced spring elements 30, one for each element 16, which are generally L-shaped as shown in FIG. 3. Each L-shaped element 30 has a forwardly bowed vertical arm 31 and a slightly downwardly bowed horizontal arm 32. Spring elements 30 are made of flattened wire so that the width thereof in a direction transversely of the seat is slightly greater than the thickness thereof (FIGS. 5-7). The free end of arm 32 of each spring element 30 extends generally transversely in the form of a short leg 33. Each arm 32 extends horizontally beneath the central load bearing portion 17 of a spring element 16 with the leg 33 thereof tensioned and having its free end connected to one of the straight bars 20 by a sleeve 33a. In the untensioned state, the leg 32 extends upwardly above the load bearing portion 17. Vertical arm 31 of each element 30 extends upwardly between the upper loop of rear supporting portion 19. If the rear end of load supporting portion 17 overlies portion 18, vertical arm 31 may extend upwardly between transverse bars 20 of the rearmost loop of load supporting portion 17. The upper end of arm 31 is pivotally connected with a spring element 35. Spring elements 35 are provided between the upper ends of spring elements 30 and top rail 13 to yieldingly support the upper end of spring elements 30 for movement toward and away from rail 13 and upwardly and downwardly relative thereto.

Each spring element 35 supports the upper ends of two spring elements 30 and, as shown in FIG. 2, comprises a horizontal bar 36, a first set of vertical bars 37 extending downwardly from the ends of the bar 36, a second set of inwardly extending horizontal bars 38 extending from the lower ends of the vertical bars 37, a second set of generally vertical bars 39 extending upwardly from the inner ends of the horizontal bars 38 and a second set of horizontal bars 40 extending outwardly from the upper ends of vertical bars 39. Bars 39 and 40 lie in a plane forming an angle with the plane containing bars 36, 37 and 38 so that each spring element 35 has a generally V-shape with the apex of the V extending downwardly. Bars 40 are fastened to rail 13 by hooking them over tabs 41 struck outwardly from a generally vertical plate 42 mounted on rail 13. Referring to FIG. 9, the upper end of each element 30 is formed with a hook 34 having an upwardly extending loop 34a and a downwardly extending loop 34b. Loop 34a passes over a depression 44 in border wire 45 and loop 34b passes under a bar 36. The border wire 45 is fastened to element 35 by sleeve 43a which is looped about the border wire and a central elevated portion 43 on element 35. In this manner, the upper end of each element 30 is locked between the border wire 45 and the support element 35.

Short sinuous spring elements 46 are provided between the side rails 15 and the side portions of border wire 45 to assist in supporting the border wire. A border wire 47 is also provided on the bottom cushion portion of the seat and is held in position by side arch elements 48 and V-shaped sinuous springs 49 in a manner well-known and conventional in the art. The ends of border wires 45, 47 are turned inwardly and fastened to one another by a metal clip.

The seat is upholstered in the usual fashion by providing the suitable padding 50 and an outer trim cover 51.

Referring to FIG. 4, the clearance space S between the arm 32 of element 30 and the central load bearing portions 17 of element 16 may be varied depending upon the desired softness required for the bottom seat portion. If it is desired that the bottom seat cushion have a soft touch to the hand, that is, a soft showroom feel, the space S is made greater.

In use, a passenger sits on the seat cushion and if he is of average weight immediately causes the portion 17 to engage arm 32. If the person is of lighter than average weight, there will be a certain permissible independent operation of the element 16 until the portion 17 engages the arm 32 because of the clearance space S. After the central portion 17 engages arm 32, they operate together. As the portion 32 moves downwardly, arm 31 of element 30 tends to straighten out and because of the yielding support of the upper end therof, tends to open the spring element 35. Specifically, because of the engagement of the free ends 40a of element 35 with plate 42, bars 40 are subjected to a twisting or torsion action as the load pulls the arm 31 downwardly. In addition, bars 39 swing about the axis of bars 40 in a counterclockwise direction as viewed in FIG. 4 successively to positions B and C. At the same time, bars 38 are subjected to torsion, bars 37 swinging about the axis of bars 38 in a counterclockwise direction as shown in FIG. 4 to successive positions B and C.

As the vehicle moves along the road and passes over bumps, the elements 30 tend to move upwardly and downwardly in the manner described. In this manner, the back cushion moves in unison with the seat cushion preventing displacement or upward movement of the clothing of the passenger.

By utilizing straight spring elements 30 which are formed of flattened wire, a minimum of wire is used thereby reducing substantially the cost of the seat. By using a spring element 35 to support a plurality of spring elements 30, a further reduction in cost is achieved.

We claim:

1. A seat comprising a seat frame having a front rail and a rear rail, a plurality of spaced sinuous spring elements, each said spring element comprising a central load bearing portion which is normally arched upwardly, a front supporting portion extending from the front end of said central portion and fastened to said front rail and a rear supporting portion extending from the rear of said central portion and fastened to said rear rail, each said supporting portion being generally V-shaped, each said central load bearing portion comprising a series of connected reversely disposed loops, a back frame positioned adjacent the rear portion of said seat frame, a plurality of straight wire spring elements extending generally vertically, each said spring element having a major portion thereof lying in a single plane, the lower end of each said spring element being pivotally fastened to the central load bearing portion of a sinuous spring element, and a plurality of yieldable spring elements interconnecting the upper ends of said straight spring elements to said back frame, each said yieldable spring element having a V-shaped portion with the apex of the V extending downwardly, each said yieldable spring element supporting the upper ends of two straight spring elements, each said yieldable spring element comprising a horizontal bar to which the upper ends of a pair of straight spring elements are attached, a first set of vertical bars extending downwardly from the ends of said horizontal bar, a first set of horizontal bars extending inwardly from the lower ends of said vertical bars, said horizontal bar, first set of vertical bars, and first set of horizontal bars lying in the same plane, a second set of vertical bars extending upwardly from the inner ends of said first set of horizontal bars at an angle to the said plane, and a second set of horizontal bars extending outwardly from the upper ends of said second set of vertical bars and pivotally connected to said back frame.

2. The combination set forth in claim 1 wherein the angle between said second set of vertical bars and said plane containing said first set of vertical bars is approximately forty-five degrees.

3. A seat construction comprising a seat frame having means forming front, rear and top rails, a plurality of sinuous springs supported at their opposite ends on said front and rear rails, a plurality of substantially straight as distinguished from sinuous, wire spring elements, each said straight spring element being generally L-shaped and having a generally vertical portion and a generally horizontal portion, means for connecting the upper ends of the vertical portions to the top rail for yielding movement toward and away from and upwardly and downwardly relative to said top rail, said vertical portion extending downwardly through a sinuous spring so that the horizontal portion of said straight spring element extends beneath said sinuous spring and forwardly toward said front rail, means for connecting the free end of the horizontal portion to a sinuous spring intermediate its ends so that a clearance space is provided between the sinuous spring element and the horizontal portion, each said straight spring element having the portions thereof intermediate the ends unattached to the corresponding sinuous spring whereby when a person sits on the seat there is a certain permissible independent operation of the sinuous spring until the sinuous spring engages the horizontal portion of the straight spring element.

4. The combination set forth in claim 3 wherein each said straight spring element has a flat cross section, the width of said spring element in a direction transversely of said seat being greater than the thickness thereof.

5. The combination set forth in claim 3 wherein the means for supporting each said straight spring element includes a V-shaped supporting portion, the apex of the V extending downwardly with the free ends of the legs of the V connected to the upper ends of the straight spring elements and the top rail, respectively.

6. The combination set forth in claim 3 wherein the vertical portion of each said straight spring element is forwardly bowed and the horizontal portion of each said spring element is downwardly bowed.

7. A seat comprising a seat frame having a front rail and a lower rear rail, a plurality of spaced sinuous spring elements, each said spring element comprising a central load bearing portion which is normally arched upwardly, a front supporting portion extending from the front end of said central portion and fastened to said front rail and a rear supporting portion extending from the rear of said central portion and fastened to said rear rail, each said supporting portion being generally V-shaped, each said central load bearing portion comprising a series of connected reversely disposed loops, said frame also including an upper rear rail, a plurality of straight, as distinguished from sinuous, wire spring elements, each said straight spring element having a generally vertical portion extending downwardly through one of the loops of the central load bearing portion of the corresponding sinuous spring element and a horizontal portion extending below and forwardly toward the front rail in spaced relation to the central load bearing portion, said vertical and horizontal portions of each said straight spring element lying in a single plane, means for yieldingly supporting the upper ends of the vertical portions of said straight spring elements on said upper rear rail for yielding movement toward and away from and upwardly and downwardly relative to said upper rear rail, and means for pivotally fastening the free end of the horizontal portion of each said straight spring element to its corresponding sinuous spring element intermediate the ends of the central load bearing portion of said sinuous spring element, each said straight spring element having the portions thereof intermediate its ends unattached to the corresponding sinuous spring element, said horizontal portion being in spaced relation to said central load bearing portion so that when a person sits on said seat there is a certain permissible independent operation of the straight spring element until the central load bearing portion of the sinuous spring element engages the horizontal portion of the straight spring element.

8. The combination set forth in claim 7 wherein each said loop in said load supporting portion comprises straight transverse bars connected by straight longitudinally extending bars, each said straight spring element having a flat cross section, the width of said spring element in the direction transversely of the seat being greater than the thickness thereof.

9. A spring element comprising a single piece of wire bent in an L-shape and comprising a generally vertical straight portion and a generally horizontal straight portion, said vertical and horizontal portions lying in a substantially single plane, said vertical portion being forwardly bowed and said horizontal portion being downwardly bowed, the upper end of the vertical portion being formed with a hook including an upwardly extending loop and a downwardly extending loop, the free end of the horizontal portion having a part extending transversely out of the plane of the vertical portion and horizontal portion.

10. The spring element set forth in claim 9 wherein the cross section of said spring element is flat, the greater width of said cross section being in a direction transverse to the plane of the spring element.

References Cited in the file of this patent

UNITED STATES PATENTS

| | | |
|---|---|---|
| 2,731,075 | Flint | Jan. 17, 1956 |
| 2,835,314 | Neely | May 20, 1958 |
| 2,849,057 | Neely | Aug. 26, 1958 |
| 2,855,984 | Marjorana et al. | Oct. 14, 1958 |
| 2,859,802 | Asaro | Nov. 11, 1958 |
| 2,925,855 | Caughey | Feb. 23, 1960 |
| 2,936,825 | Neely | May 17, 1960 |

FOREIGN PATENTS

| | | |
|---|---|---|
| 635,466 | Great Britain | Apr. 12, 1950 |
| 645,113 | Great Britain | Oct. 25, 1950 |